United States Patent [19]
Burgess

[11] Patent Number: 6,000,701
[45] Date of Patent: Dec. 14, 1999

[54] LABYRINTH SEAL ASSEMBLY AND METHOD

[75] Inventor: Raymond W. Burgess, Bradford, Pa.

[73] Assignee: Dresser-Rand Company, Corning, N.Y.

[21] Appl. No.: 08/990,293

[22] Filed: Dec. 15, 1997

[51] Int. Cl.[6] .................................................. F16J 15/447
[52] U.S. Cl. .......................... 277/412; 277/303; 277/304; 277/431; 277/926
[58] Field of Search .................................... 277/411, 412, 277/431, 926, 303, 304, 579, 580

[56] References Cited

U.S. PATENT DOCUMENTS

| | | | |
|---|---|---|---|
| 2,846,245 | 8/1958 | Weaver | 277/412 |
| 2,891,808 | 6/1959 | Richardson | 277/412 |
| 3,989,410 | 11/1976 | Ferrari . | |
| 4,114,048 | 9/1978 | Albaric . | |
| 4,257,617 | 3/1981 | Hill . | |
| 4,273,343 | 6/1981 | Visser . | |
| 4,463,956 | 8/1984 | Malott . | |
| 5,085,443 | 2/1992 | Richards . | |
| 5,104,284 | 4/1992 | Hustak, Jr. et al. | 415/105 |
| 5,190,440 | 3/1993 | Maier et al. . | |
| 5,211,535 | 5/1993 | Martin et al. . | |
| 5,224,713 | 7/1993 | Pope . | |

FOREIGN PATENT DOCUMENTS 266126  10/1913  Germany ................................ 277/412

*Primary Examiner*—Anthony Knight
*Assistant Examiner*—Alison K. Pickard
*Attorney, Agent, or Firm*—Haynes & Boone, L.L.P.

[57] ABSTRACT

A labyrinth seal system and method for sealing against the flow of a fluid along a rotating member according in which a fixed housing surrounds the rotating member and one or more sealing members extend from the housing and engage the rotating member for wiping a portion of the fluid off of the rotating member and thus preventing the wiped fluid from passing through the sealing member and along the rotating member. The rotation of the rotating member causes air to flow outwardly from the shaft to normally promote the flow of the fluid along the rotating member and through the sealing member, and a member is associated with the housing for breaking the vacuum.

16 Claims, 2 Drawing Sheets

LABYRINTH SEAL ASSEMBLY AND METHOD

BACKGROUND OF THE INVENTION

The present invention relates generally to seals for rotating shafts, and, more particularly, to a multi-stage, stationary, labyrinth seal assembly surrounding a rotating shaft.

Labyrinth seals have been used to minimize fluid flow from a high pressure side of the seal to a low pressure side thereof. However, there is inevitably some fluid leakage across the labyrinth seal especially when the seal is established along a rotating body, such as a rotating shaft, or the like, since the rotating body often causes a flow of air radially outwardly from the low pressure side of the labyrinth seal, thereby forming a vacuum and increasing the pressure drop across the seal.

In U.S. Pat. No. 5,085,443, an external fluid source is used to limit such leakage. This is accomplished by a plurality of radially extending purge openings formed in the seal to provide a flow of inert gas around the labyrinth seal to provide a thin fluid film through the radial purge openings, so that the seal rides on the thin film. The fluid is introduced at the center of the seal to provide buffering to minimize leakage of lubricating oil or process fluids. However, the external fluid source increases the complexity of the structure and presents a problem if no such external fluid source is readily available.

In U.S. Pat. No. 5,224,713, radial passages are disclosed in a rotating labyrinth seal. The passages extend from the low pressure side of the labyrinth seal to a channel between the teeth of the seal at the low pressure end of the seal. Air entrained in the passages is subjected to centrifugal force causing the air to move away from the center of rotation. The passages function as a pump to move the air radially outwardly. This device however, requires that the labyrinth seal body rotate and is therefore not adaptable to a stationary labyrinth seal body.

Therefore, what is needed is a stationary labyrinth seal assembly which minimizes or eliminates leakage across the seal and which does not require an external fluid source.

SUMMARY OF THE INVENTION

To this end, according to an embodiment of the present invention, a multi-stage labyrinth seal assembly is provided for sealing against the flow of a fluid along a rotating member. The seal assembly includes a fixed housing surrounding the rotating member and one or more sealing members extending from the housing and engaging the rotating member for wiping a portion of the fluid off of the rotating member. The wiped fluid is thus prevented from passing through the seal and along the rotating member. The rotation of the rotating member causes air to flow outwardly from the shaft to normally promote the flow of the fluid along the rotating member and through the sealing member, and a member is associated with the housing for breaking the vacuum.

Principal advantages of this embodiment include the provision of multiple stage sealing, and the utilization of readily available air which surrounds the seal, and which is passed to the sealing members to break a vacuum normally caused by the air and to form a barrier between the high and low pressure sides of the seal. As a result, leakage across the seal surface between the shaft and the labyrinth seal is minimized or eliminated.

DESCRIPTION OF THE PREFERRED EMBODIMENT

Figure 1:
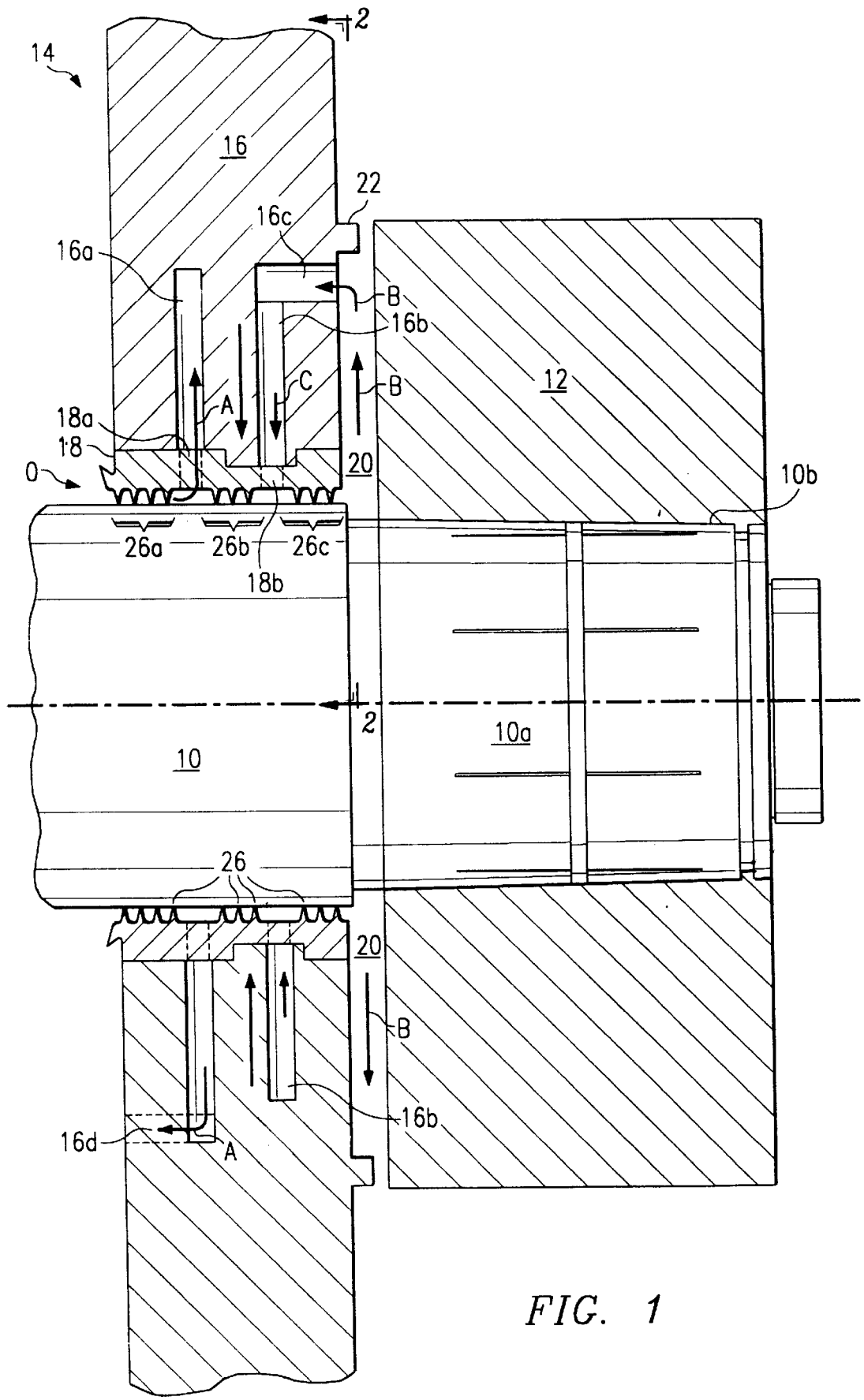
FIG. 1 is a cross-sectional view of the labyrinth seal assembly of the present invention shown in an operative relation with a shaft and a coupling.

Referring to FIG. 1 of the drawings, the reference numeral 10 refers, in general to a rotor, a shaft, or the like, which has a slightly reduced-diameter end portion 10a which is attached to a disc-shaped coupling member 12, in any known manner. It is understood that the coupling member 12 is connected to a power source, such as a turbine, a motor, or the like (not shown), for imparting a relatively high rotational speed to the coupling member, and therefore to the shaft 10. Since the coupling member 12 is conventional, it is not shown, nor will it be described, in any further detail. The shaft 10 can be associated with a centrifugal compressor, or any type of conventional equipment (not shown), in which the shaft rotates and a bearing, or the like, is provided for the shaft that is cooled by oil, or other types of similar fluid.

The labyrinth seal assembly of the present invention is shown generally by the reference numeral 14 and is disposed just upstream from the coupling member 12. The assembly 14 is formed by a fixed, disc-shaped, housing 16 having a center opening surrounding a portion of the shaft 10. Although not clear from the drawings, the housing 16 is split into an upper half and a lower half as viewed in FIG. 1, with the halves being connected in any known manner.

An annular labyrinth seal 18 extends between the housing 16 and the shaft 10 and is attached to the inner surface of the housing 16 defining its center opening in any known manner. The seal 18 engages the corresponding outer surface of the shaft 10 to seal against the flow of fluid along the shaft, as will be described in detail later.

Figure 2:
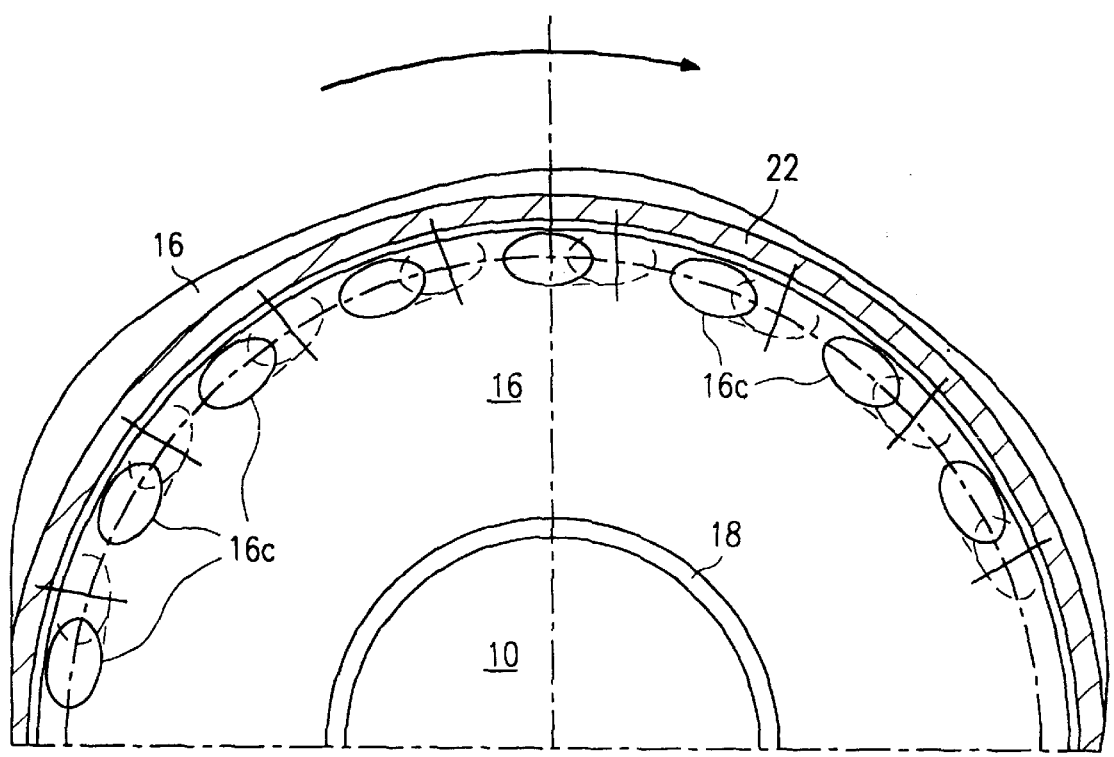
FIG. 2 is a sectional view taken along the line 2—2 of FIG. 1.

The facing ends of the coupling member 12 and the housing 16 are slightly spaced apart to form an annular air flow passage 20. An annular lip 22 is formed on this end of the housing at the outer end of the passage 20 for reasons to be described. Two axially-spaced annular passages 16a and 16b are formed in the housing 16 with each passage extending radially outwardly from the seal 18 to an area in the housing 16 just below the lip 22. A plurality of axially-extending passages 16c extend from the outer end of the passage 16b in the upper portion of the housing 16 to the end of the housing facing the coupling member 12 and thus connect the passage 16b to the air flow passage 20. As shown in FIG. 2, the passages 16c are angularly spaced around the upper portion of the housing 16 and each passage extends at an angle with respect to the face, or surface, of the latter end of the housing, for reasons to be described.

Referring to FIG. 1, an axially-extending passage 16d is located in the lower portion of the housing 16 and extends from the outer end of the passage 16a to the end of the housing opposite the one facing the coupling member 12. The passage 16d extends perpendicular to the face, or surface, of the latter end of the housing 16 and connects the passage 16a to an area externally of the end of the housing opposite the end facing the coupling 12. Since, in a typical installation, the above-mentioned bearing (not shown) for the shaft 10 would be located adjacent to, and slightly spaced from, the housing 16, the passage 16d communicates with the space, or area between the bearing and the housing, which area forms the oil drainage area for the bearing.

The seal 18 includes a plurality of axially spaced, annular, teeth-like sealing members 26 the respective ends of which engage the outer surface of the shaft 10. The sealing members 26 are formed into three spaced groups 26a–26c, and two series of radially-extending openings 18a and 18b extend through the seal 18 and communicate with the respective spaces between the groups. The openings 18a are angularly spaced around the seal 18 and register with the space between the sealing member groups 26a and 26b, and the openings 18b are also angularly spaced around the seal and register with the space between the sealing member groups 26b and 26c. Also, the openings 18a register with the inner end of the passage 16a, and the openings 18b register with the inner end of the passage 16b for reasons to be explained.

As stated above, in a typical installation, the seal 18 is disposed just downstream from an oil drainage area of a bearing associated with the shaft 10. Therefore, when the coupling member 12 drives the shaft 10 at a relatively high speed in the direction indicated by the arrow in FIG. 2, some of the cooling oil draining from the bearing will escape the normal drain system for the bearing and flow down the outer surface of the shaft 10 towards the coupling member 12 in the direction indicated by the arrow O in FIG. 1. The seal assembly 14 of the present invention functions, in a manner to be described, to wipe this oil off of the shaft 10 and drain it back into the area between the bearing and the seal assembly for drainage through the normal drain system for the bearing.

In operation, the coupling member 12 is rotated by the above-mentioned power source at a relatively high speed, causing a corresponding rotation of the shaft 10. Some of the oil draining from the above-described bearing associated with the shaft 10, will flow along the outer surface of the shaft in the direction indicated by the arrow O in FIG. 1. However, the seal 18, and specifically the sealing members 26 in the group 26a will wipe the oil off of the shaft 10 and drain it back to the drain system for the bearing, thus preventing it from passing to the coupling 12.

In the event the oil does, in fact, pass through the seal provided by the sealing member group 26a of the seal 18, it will enter the space between the sealing member groups 26a and 26b and flow into the passage 16a. The oil will thus flow radially outwardly in the passage 16a before passing through, and discharging from, the passage 16d in the lower half of the housing 16, as shown by the arrows A. The oil discharging from the passage 16d enters the area between the bearing (not shown) and the seal assembly 14 which corresponds to the oil drainage area of the bearing. As a result, least a portion of this oil will enter the normal drain system for the bearing, while the remaining portion of the oil will recirculate back to the seal 18 and either will be wiped off the shaft 10 by the sealing member group 26a or will pass through the latter group and be recirculated through the passages 16a and 16d to the drain system for the bearing, as described above. This considerably reduces the chances that the oil will advance as far as the sealing member group 26b.

During this flow of the oil, the above rotation of the coupling 10 at a relatively high speed creates a pumping effect that promotes the flow of air in the passage 20 radially outwardly from the shaft 10 in the direction indicated by the arrows B in FIG. 1. This air would normally escape from the radially outer end of the passage 20 while creating a low pressure area, or vacuum, around the shaft 10. This, in turn, has the undesirable effect of promoting the flow of the oil along the outer surface of the shaft 10 in the direction indicated by the arrow O and possibly through one or more of the sealing member groups 26a–26c of the seal 18. However, according to a feature of the present invention, the annular lip 22 diverts, or deflects, this high pressure air flow through the passage 20 into the passages 16c and thus breaks the above vacuum and traps or deflects the air flow into the passages 16c. The air thus flows into the passages 16c with the angular disposition of the passages relative to the end face of the housing (FIG. 2) promoting this flow. The diverted air flows through the passages 16c and into the passage 16b through which it flows radially inwardly and then into and through the openings 18b in the seal 18, as shown by the arrows C. The air is thus discharged into the space between the sealing member groups 26b and 26c and circulates through the sealing member group 26c back into the passage 20, thus breaking the above-mentioned vacuum. This eliminates the low pressure that would tend to promote the flow of the oil along the shaft and, in addition, creates a high pressure barrier between the sealing member groups 26b and 26c thus increasing the sealing effect of the latter groups. As a result, the chances of the oil passing through the entire seal 18, including all of the sealing member groups 26a–26c, and to the coupling 12, resulting in an undesirable venting of the oil or oil fumes into the atmosphere, are considerably reduced, if not eliminated.

Therefore, as a result of the foregoing, an effective and relatively simple multi-stage sealing assembly is provided which minimizes or eliminates leakage across the seal for a rotating shaft and which does not require an external fluid source.

It is understood that variations may be made in the foregoing without departing from the scope of the invention. For example, the invention is not limited to sealing the flow of oil along a rotating shaft but is equally applicable to the sealing of any fluid along any component. Also, the source of the oil is not limited to a bearing associated with a shaft, but can equally apply to any source of oil. Further, the number of sealing members 26 and sealing member groups associated with the seal 18 can be varied within the scope of the invention.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiment disclosed herein.

What is claimed is:

1. A seal assembly for sealing against the flow of a fluid along a rotating member, the assembly comprising:

a fixed housing surrounding the rotating member, at least two sealing members extending from the housing and engaging the rotating member for wiping at least a portion of the fluid off the rotating member and thus preventing the latter fluid from passing along the rotating member and through the sealing members, wherein the rotation of the rotating member causes air to flow outwardly from the shaft to normally promote the flow of the fluid along the rotating member and through the sealing members, and the housing further comprising:

a first passage formed through the housing and the sealing members for receiving the air flow and directing the diverted air to a space between the at least two sealing members to create a high pressure barrier between the at least two sealing members to increase the fluid seal, and a second passage formed in the housing for receiving fluid passing through at least one of the sealing members and recirculating the fluid from an area downstream of the at least one sealing member to an area upstream of the at least one sealing member.

2. The seal assembly of claim 1 further comprising an annular lip formed on the housing for diverting the flow of the air from the space to the first passage.

3. The seal assembly of claim 1 wherein the at least two sealing members comprises a first sealing member, a second sealing member, and a third sealing member.

4. The seal assembly of claim 3 wherein the second passage recirculates the fluid portion that passes through the first sealing member and into the space between the first sealing member and the second sealing member, and the first passage directs the air into the space between the second sealing member and the third sealing member to create a high pressure barrier for preventing fluid seepage into the third sealing member.

5. A method for sealing against the flow of a fluid along a rotating member, the method comprising the steps of:
   establishing a seal around the rotating member for wiping a first portion of the fluid off of the rotating member and thus preventing the first fluid portion from passing along the rotating member and through the seal, the rotation of the rotating member causing air on the downstream side of the seal to flow outwardly from the shaft to normally promote the flow of the fluid along the rotating member,
   receiving a second portion of the fluid passing through the seal,
   recirculating the second fluid portion from an area downstream of the seal to an area upstream of the seal, and
   breaking the vacuum caused by the outward air flow by diverting the airflow back towards the rotating member through a passage formed through the housing and the seal.

6. The method of claim 5 wherein the step of diverting comprises the step of establishing a high pressure barrier to the passage of the second fluid portion along the shaft.

7. In combination:
   a rotor;
   a coupling member attached to the rotor for causing rotation of the rotor; and
   a housing surrounding a portion of the rotor adjacent to the coupling member, wherein a first side of the housing abuts a fluid-filled space and the opposing side of the housing abuts an air-filled space, the air-filled space defined by the housing, the rotor, and coupling member, the housing comprising:
      a sealing member for engaging the rotor,
      a first passage connecting the air-filled space to the sealing member,
      an annular lip for diverting air flow from the air-filled space produced by the rotation of the rotor into the passage, thus creating a high pressure barrier in the sealing member and preventing fluid flow along the rotor to the air-filled space, and
      a second passage connecting the sealing member to the fluid-filled space for recirculating fluid that seeps under the sealing member back into the fluid-filled space.

8. The combination of claim 7 wherein the sealing member is divided into three groups, each group having a plurality of teeth for engaging the rotor, and wherein the second passage is disposed between the first and second group, and the first passage is disposed between the second and third group.

9. A seal assembly for sealing against the flow of a fluid along a rotating member, the assembly comprising a fixed housing surrounding the rotating member, at least two spaced sealing members extending from the housing and engaging the rotating member for creating a seal against the flow of fluid along the rotating member, a first passage formed in the housing and extending from a space between the at least two sealing members for receiving any fluid that passes through one of the two sealing members and passing the latter fluid to an area upstream of the one sealing member, a second passage formed through the housing and extending downstream of the first passage, and a lip formed on the housing for diverting into the second passage any air flow caused by the rotation of the rotating member, the second passage directing the diverted air to a space between the at least two sealing members to create a high pressure barrier between the at least two sealing members to increase the fluid seal.

10. The assembly of claim 9 wherein a coupling member is connected to the rotating member and is spaced from the housing, the air flow being in the space between the coupling member and the housing.

11. The assembly of claim 10 wherein a vacuum is caused by the air flow in the latter space and wherein the lip breaks the vacuum.

12. The assembly of claim 9 wherein there are three spaced sealing members extending from the housing, one of the sealing members extending downstream from another sealing member, and a third sealing member extending downstream from the one sealing member, the first passage receiving fluid from the space between the one sealing member and the other sealing member, and the second passage directing the diverted air to a space between the one sealing member the third sealing member.

13. The assembly of claim 12 wherein the first passage directs the fluid back to an area upstream of the other passage for recirculation.

14. A method of sealing a rotating member comprising the steps engaging the rotating member with at least two spaced sealing members for creating a seal against the flow of fluid along the rotating member, forming a first passage extending from a space between the at least two sealing members for receiving any fluid that passes through one of the two sealing members, passing the latter fluid to an area upstream of the one sealing member, forming a second passage extending downstream of the first passage, and diverting into the second passage any air flow caused by the rotation of the rotating member, the second passage directing the diverted air to a space between the at least two sealing members to create a high pressure barrier between the at least two sealing members to increase the fluid seal.

15. The method of claim 14 wherein a coupling member is connected to the rotating member and is spaced from the housing, the air flow being in the space between the coupling member and the housing.

16. The method of claim 14 wherein a vacuum is caused by the air flow in the latter space and further comprising the step of breaking the vacuum.

* * * * *